United States Patent

Larsson

[11] Patent Number: 5,584,368
[45] Date of Patent: Dec. 17, 1996

[54] SHOCK ABSORBER

[75] Inventor: Lennart Larsson, Upplands Vasby, Sweden

[73] Assignee: Yamaha Hatsudoki Kabushiki Kaisha, Iwata, Japan

[21] Appl. No.: 399,873

[22] Filed: Mar. 7, 1995

[30] Foreign Application Priority Data

Mar. 11, 1994 [SE] Sweden .................................. 9400838

[51] Int. Cl.$^6$ ...................................................... F16F 9/36
[52] U.S. Cl. ................... 188/322.17; 188/322.16
[58] Field of Search .......................... 277/58, 138, 165; 188/315, 322.16–322.18

[56] References Cited

U.S. PATENT DOCUMENTS

| | | | |
|---|---|---|---|
| 4,494,632 | 1/1985 | de Baan et al. | 188/322.17 |
| 4,987,826 | 1/1991 | Deppert et al. | 188/322.17 |
| 5,098,071 | 3/1992 | Umetsu | 188/322.17 |
| 5,178,243 | 1/1993 | Hamada et al. | 188/322.17 |
| 5,441,132 | 8/1995 | Pradel et al. | 188/322.17 |

Primary Examiner—Robert J. Oberleitner
Assistant Examiner—Chris Schwartz
Attorney, Agent, or Firm—Knobbe, Martens, Olson & Bear

[57] ABSTRACT

A number of embodiments of shock absorbers particularly designed for use with vehicles in low temperatures where ice formation on the piston rod of the shock absorber can be a problem. In each embodiment, a hard disc-shaped scraper ring is supported at the open end of the shock absorber around the piston rod with a slight clearance for scraping the ice from the piston rod. Various support and sealing arrangements are also disclosed.

16 Claims, 3 Drawing Sheets

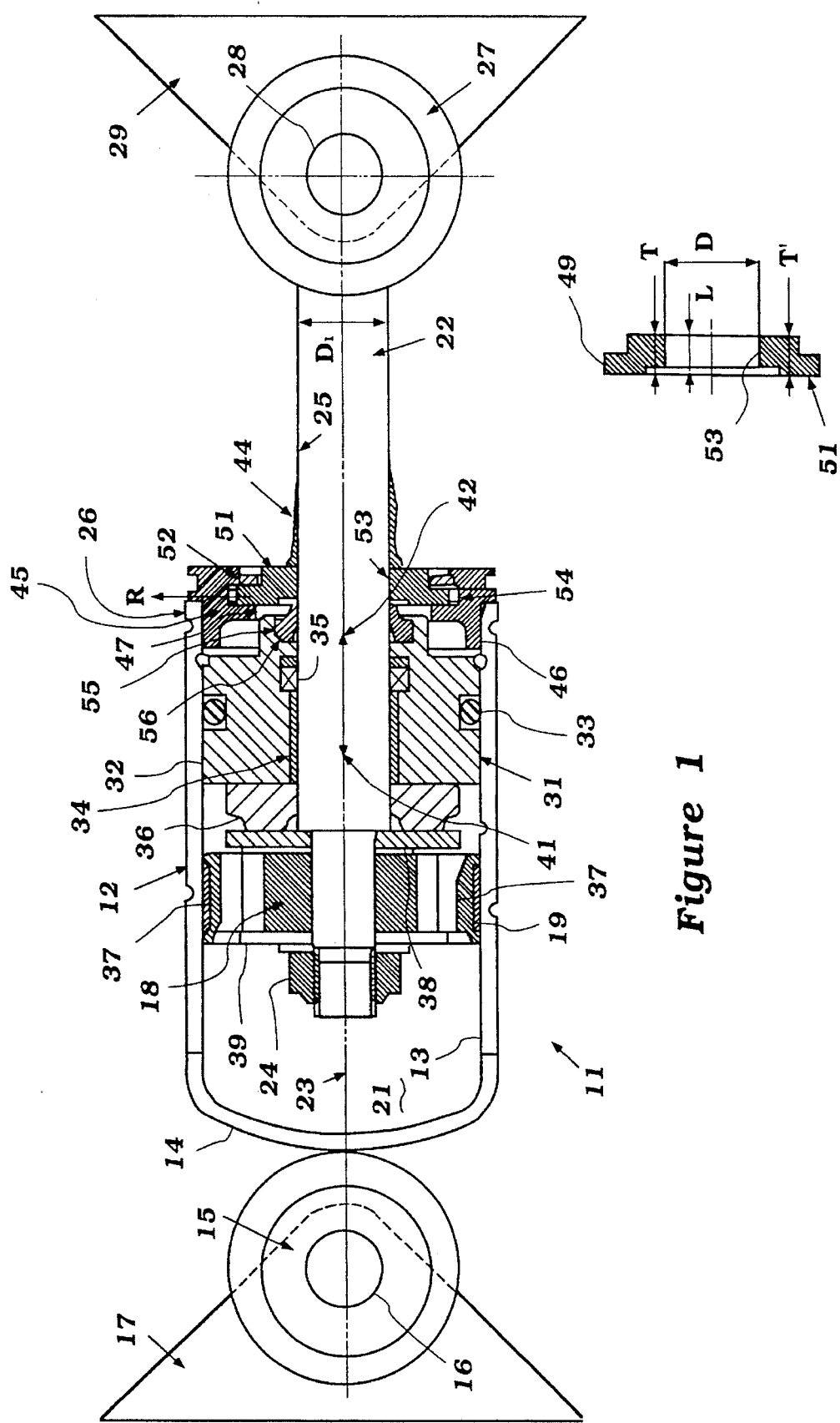

5,584,368

SHOCK ABSORBER

BACKGROUND OF THE INVENTION

This invention relates to a shock absorber and more particularly to an improved shock absorber construction for use in vehicles subjected to cold climatic conditions.

As is well known, the suspension system for many types of vehicles includes a shock absorber for damping vibrations encountered when the ground engaging element of the vehicle strikes an obstacle so as to control the movement of the ground engaging element relative to the vehicle body.

These shock absorbers generally comprise an outer cylindrical housing that is closed at one end by an integral wall and which receives a slidably supported piston. The housing is connected to one element of the vehicle. The piston has connected to it a piston rod that extends through the other end of the cylinder housing and which is connected to another element of the vehicle so that the piston and cylinder will move relative to each other during suspension movement. A hydraulic damping arrangement is provided for controlling the flow of fluid from the chambers formed by the piston so as to dampen the vehicle suspension movement.

The end of the piston rod which extends through the open end of the cylinder housing is normally sealed in some manner relative to the cylinder housing so as to define a further fluid chamber on the side of the piston adjacent the otherwise open end of the housing. The piston rod normally slides through this seal and various sealing arrangements are employed so as to ensure against fluid leakage.

Frequently, however, the vehicle is subjected to use in low temperatures and climates where there may be water or snow that can accumulate on the exposed elements of the shock absorber. These climatic conditions can and do cause ice to form on the piston rod of the shock absorber. Since the piston rod may at times be stationary relative to the cylinder, this means that ice can accumulate on the piston rod adjacent the seal. When the vehicle then encounters an obstacle, this ice will be forced into contact with the seal and can damage it and the entire shock absorber mechanism.

There have been proposed the use of resilient scrapers or seals in addition to the fluid seal with a hope that these additional resilient scrapers can remove the ice and prevent damage to the hydraulic seal. However, these resilient seals are not sufficiently rigid so as to remove the accumulated ice. Furthermore, there is a danger that the ice may pass through the resilient scraper and accumulate within the interior of the shock absorber so as to cause corrosion and other possible damage.

It is, therefore, a principle object of this invention to provide an improved shock absorber arrangement for a vehicle.

It is a further object of this invention to provide an improved shock absorber arrangement for a vehicle that is particularly adapted for use in cold climates.

It is another object of this invention to provide an improved ice scraper arrangement for the piston rod of a hydraulic shock absorber for a cold weather vehicle.

SUMMARY OF THE INVENTION

This invention is adapted to be embodied in a hydraulic shock absorber for a vehicle that is subjected to cold weather use. The shock absorber comprises an outer housing that defines a cylinder bore closed at one end by a wall and containing a piston to define at least one fluid chamber. A piston rod is affixed to the piston and extends from beyond the other end of the cylinder bore. The outer housing and piston rod are adapted to be affixed to respective components of the vehicle for relative movement when obstacles are struck. The outer housing other end is spaced outwardly from the piston rod. A rigid disc-shaped member is restrained axially relative to the outer housing other end and defines an opening through which the piston rod extends with a slight clearance. As a result, the disc-shaped member will act as a scraper for scraping accumulated ice from the piston rod upon its movement relative to the outer housing.

BRIEF DESCRIPTION OF THE DRAWINGS

FIG. 1 is a cross-sectional view taken along the axis of a shock absorber constructed in accordance with a first embodiment of the invention.

FIG. 2 is an enlarged view of the scraper disc of this embodiment.

DETAILED DESCRIPTION OF THE PREFERRED EMBODIMENTS OF THE INVENTION

Figure 3:
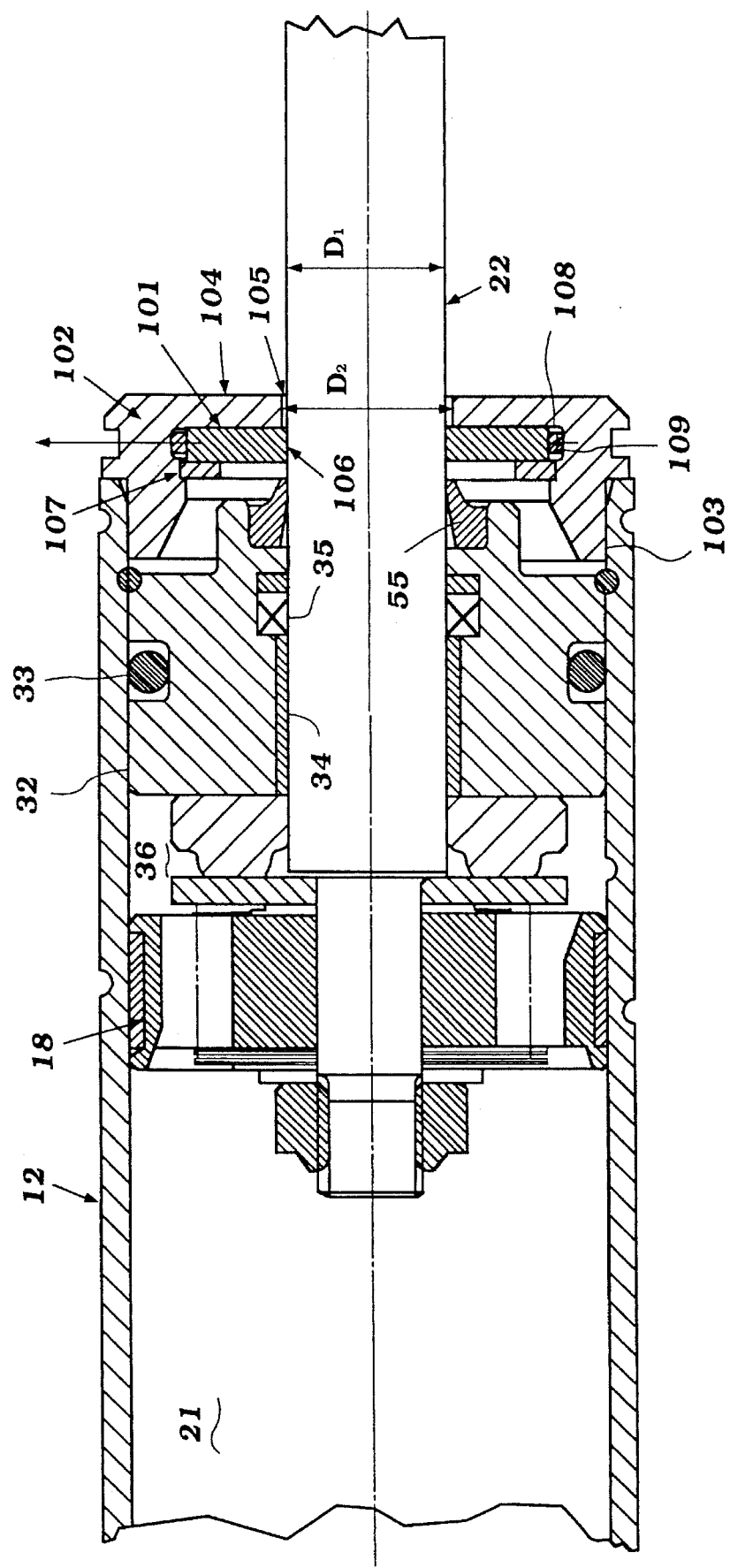
FIG. 3 is an enlarged partial cross-sectional view, taken along a plane similar to FIG. 1, and shows a second embodiment of the invention.

Referring now in detail to the drawings and initially to FIG. 1, a hydraulic shock absorber constructed in accordance with a first embodiment of the invention is identified generally by the reference numeral 11. The shock absorber 11 is designed, as will become readily apparent, for use in vehicles that are designed for use in cold environments such as snowmobiles or the like. Although the invention is described in conjunction with track-driven vehicles such as a snowmobile, it will be readily apparent to those skilled in the art that the invention is also capable of use with wheeled vehicles.

The shock absorber 11 includes an outer housing assembly, indicated by the reference numeral 12 which defines a cylinder bore 13 that is closed at one end by an integral end wall 14. A trunnion 15 is connected in a suitable manner to the end wall 14 and provides a connection through a pin 16 to a mounting bracket 17 which may be affixed to a portion of the vehicle, such as its body.

A piston 18 is slidably supported within the cylinder bore 13 and carries an outer seal 19 for sliding engagement with the cylinder bore 13. This piston 18 forms with the end wall 14 and cylinder bore 13 a first fluid-containing chamber 19.

The piston 18 is connected to a piston rod 22 along a longitudinal axis 23 of the cylinder bore 13 by means including a threaded fastener 24. The piston rod 22 has a portion 25 that extends beyond an end 26 of the cylinder housing 12 opposite the closed end wall 14. This portion 26 is spaced radially outwardly a substantial distance between the piston rod portion 25.

The exposed end of the piston rod 22 and specifically its portion 25 is formed with an integral trunnion 27 that is connected by means of a pin 28 to a further element 29 of the vehicle suspension system. If the portion 17 is connected to the vehicle body, the portion 29 is connected to the guide track or other portion of the drive belt of the snowmobile which provides the drive for the snowmobile. Alternatively, the portion 17 and 29 may be connected to the vehicle body and a front steering ski. In a wheeled vehicle, one of the portions 17 and 29 will be connected to the vehicle body and the other will be connected to the wheel suspension element which suspends the wheel from movement relative to the body. This construction is well known in the art.

A sealing arrangement, indicated generally by the reference numeral 31 is provided internally within the end 26 of the cylinder housing 12. This seal assembly 31 includes a closure member 32 that carries an O-ring 33 and its outer periphery sealingly engage the bore 13. An inner sliding seal 34 engages the piston rod 22. In addition, a further fluid seal 35 may be positioned at one end of the sliding seal 34 so as to define a second fluid chamber 36 which is on the side of the piston 18 opposite the chamber 21.

Check valved passages 37 having oppositely acting check valves 38 and 39 communicate the chambers 21 and 36 with each other so as to dampen the suspension movement in the directions indicated by the arrows 41 and 42. This construction is well known in the art, and for that reason further description of it is not believed to be necessary to enable those skilled in the art to practice the invention.

In accordance with the invention, the shock absorber 11 is provided with a scraper assembly, indicated generally by the reference numeral 43 for scraping any ice, indicated at 44, from the exposed portion 25 of the piston rod 22. This will ensure that ice cannot enter the interior of the shock absorber 11 and specifically cannot contact or damage the seal 35 and/or the sliding seal 34.

This scraper assembly 43 includes a support ring 45 that is formed from any suitable material and which has a cylindrical portion 46 that is received within the portion of the cylinder bore 13 adjacent the open end 26 and fixed suitably therein. This defines a chamber 47 that is disposed between the closure member 32 and the support ring 45. Adjacent the cylindrical portion 46, the support ring 45 is formed with a recess 48 of cylindrical configuration and in which a flange portion 49 of a scraper disc, indicated generally by the reference numeral 51 is retained. A snap ring 52 or the like retains this scraper disc 51 in position by confining the flange 49 in the groove 48. The scraper disc 51 is formed from a suitable material having relatively high rigidity such as a metal like bronze or an alloy.

The disc 51 defines an internal bore 53 which has a diameter D which is slightly larger than the diameter D1 of the piston rod portion 25 so that there will be a slight clearance therebetween. This diameter D extends for a length L which is equal to the dimension T of the interior portion of the scraper ring 51. The dimension T is slightly less than the total overall thickness T' of the scraper ring 51 and is in the range of 2 to 10 millimeters in length, preferably 5 millimeters.

The outer periphery of the flange 49 is smaller in diameter than the diameter of the recess 48 and an O-ring element 54 is retained in the intervening area so as to provide a resilient bias on the scraper disc 51 in the direction R so as to permit the scraper disc to move transversely relative to the axis 23 upon reciprocation of the piston 18 and piston rod 22. In a preferred embodiment, the diametral clearance between the diameters D and D1 is in the range of 0.01 to 0.05 millimeters and the preferred clearance is 0.02 to 0.03 millimeters. This distance is sufficient so as to ensure good scraping action for removing the ice 44 without causing binding in the operation.

Although the scraper disc 51 will remove substantially all of the ice from the piston rod 22, a further somewhat softer scraper member 55 may be provided in a recess 56 of the seal ring 32. This scraper member 55 is formed from a material that is softer than the scraper disc 51 such as Nitrile rubber, hard natural rubber, or similar materials. Hence, any ice which may enter the cavity 47 will be precluded from entering on the seal 35 or sliding seal 34 by this further scraper member 55. Also, any ice which accumulates in the chamber 45 will tend to melt because of the heat of the shock absorber and this water can then be drained through openings formed in the support ring 45 and/or cylinder housing 14.

FIG. 3 shows another embodiment of the invention which differs from the previously described embodiment only in the shape of the scraper ring, indicated by the reference numeral 101 and its support in the support ring, indicated generally by the reference numeral 102. Where components of the shock absorber are the same as that previously described, they have not been described again but similar components have been identified by the same reference numerals in this embodiment.

The support ring 102 has a cylindrical portion 103 similar to the portion 46 of the previously described embodiment and a recess is formed therein in which the scraper disc 101 is contained. This recess is defined by an inwardly extending flange portion 104 of the support ring 102 and which defines an internal bore 105 that has a diameter D2 which is larger than the diameters D1 and D. The diameter D2 is, however, sufficiently close to the diameter D1 so as to effectively scrape off any of the large pieces of ice. The scraper ring 101 has its internal diameter 106 which has the diameter D1 as previously noted. This scraper disc 101 is formed from a material as aforenoted and is held in axial position between the flange 104 and a snap ring 107 that is received in the support ring 102.

Again, the scraper ring 101 has an outer diameter that is smaller than the diameter of a recess 108 in which it is received in the support ring 102. An O-ring 109 is disposed between the recess 108 and the outer periphery of the scraper ring 101 so as to permit radial movement to compensate for irregularities while, at the same time, ensuring the effective scraping action as aforenoted.

Figure 4:
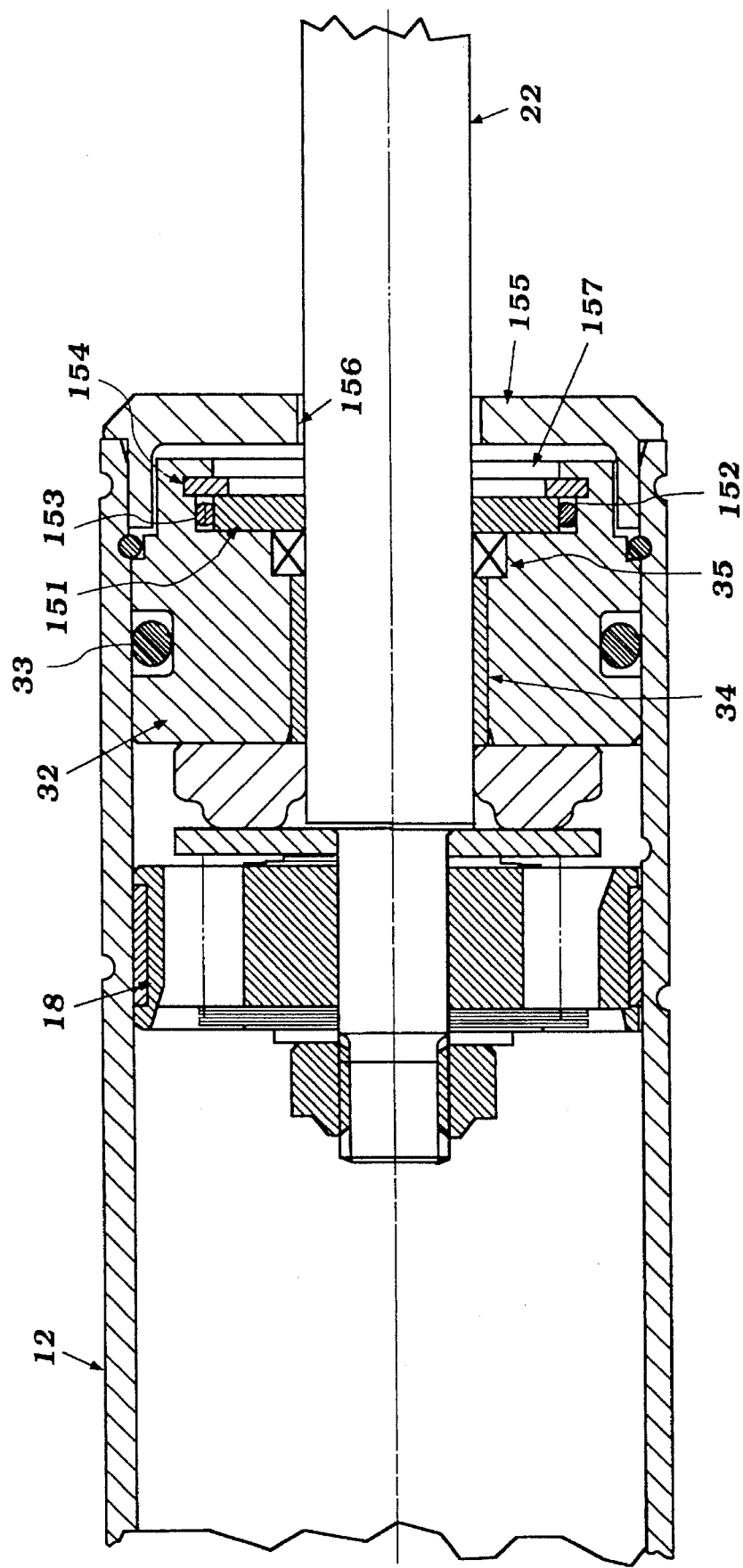
FIG. 4 is a partial cross-sectional view, in part similar to FIG. 3, and shows a further embodiment of the invention.

FIG. 4 shows another embodiment of the invention which differs from the previously described embodiments in that the scraper disc, indicated generally by the reference numeral 151 is supported not by a separate support ring but by the closure member 32. The closure member 32 is formed with a recess 152 which is of larger diameter than the outer portion of the scraper disc 151. Again, an O-ring seal 153 supports the scraper disc 151 for relative radial movement. A snap ring 154 is received at the outer end of the recess 152 so as to axially position the scraper disc 151.

In this embodiment, a closure member 155 acts to perform a portion of the function provided by the support rings 102 and 45 of the previously described embodiments. This closure member 155 has an enlarged diameter opening 156 which clears the piston rod 22. With this embodiment, the ice scraping function takes place in a cavity 157 defined between the scraper disc 151 and the closure member 155. The opening 156 is of sufficiently large diameter so that the ice which is scraped can easily fall out of the opening therebetween.

From the foregoing description it should be readily apparent that the described embodiments of the invention each provide a very effective and yet rigid scraping member that can scrape the ice from the piston rod and which will not be damaged. The scraper disc performs no significant sealing function, except possibly in conjunction with the embodiment of FIG. 4 and thus the seals can be primarily accomplished by more resilient elements. Also, since the scraper discs are supported for radial movement they can follow irregularities in the outer shape of the rod without adversely effecting the operation of the shock absorber. Of course, the foregoing description is that of preferred embodiments of the invention and various changes and modifications may be made without departing from the spirit and scope of the invention, as defined by the appended claims.

I claim:

1. A hydraulic shock absorber for a vehicle subjected to cold weather use comprised of an outer housing defining a cylinder bore closed at one end by a wall and containing a piston to define at least one fluid chamber, a piston rod affixed to said piston and extending beyond the other end of said cylinder bore, said piston rod and said outer housing providing a means for attachment to relatively suspended components of the vehicle for effecting reciprocation of the piston within the cylinder bore upon suspension movement, said outer housing being spaced outwardly from said piston rod at said other end, a rigid nonsealing disc-shaped scraper member restrained axially relative to said outer housing at said other end and defining an opening through which said piston rod extends with a slight clearance so that the disc-shaped scraper member functions as a scraper for scraping accumulated ice from said piston rod upon reciprocation of said piston rod relative to said outer housing, and a hydraulic seal carried by said outer housing in sealing engagement with said piston rod between said scraper member and said piston and formed from a substantially softer material than said scraper member.

2. A hydraulic shock absorber for a vehicle as set forth in claim 1, further including a closure member supported within the other end of the outer housing inwardly of the scraper member and defining with the piston a second fluid chamber.

3. A hydraulic shock absorber for a vehicle as set forth in claim 2, wherein the disc-shaped scraper member is supported for resilient movement in a radial direction so as to follow the irregularities of the outer periphery of the piston rod.

4. A hydraulic shock absorber for a vehicle as set forth in claim 3, wherein an O-ring element engages the outer periphery of the disc-shaped scraping member for controlling its radial position.

5. A hydraulic shock absorber for a vehicle as set forth in claim 3, further including a second scraper member disposed in the outer housing and adjacent the rigid scraper member.

6. A hydraulic shock absorber for a vehicle as set forth in claim 2, wherein the clearance between the outer diameter of the piston rod and the scraper ring opening is in the range of 0.01 to 0.05 millimeters.

7. A hydraulic shock absorber for a vehicle as set forth in claim 6, wherein the clearance is in the range of 0.02 to 0.03 millimeters.

8. A hydraulic shock absorber for a vehicle as set forth in claim 2, wherein the length of the opening in the scraper member is in the range of 2 to 10 millimeters.

9. A hydraulic shock absorber for a vehicle as set forth in claim 8, wherein the length is about 5 millimeters.

10. A hydraulic shock absorber for a vehicle as set forth in claim 1, wherein the disc-shaped scraper member is supported for resilient movement in a radial direction so as to follow the irregularities of the outer periphery of the piston rod.

11. A hydraulic shock absorber for a vehicle as set forth in claim 10, wherein an O-ring element engages the outer periphery of the disc-shaped scraping member for controlling its radial position.

12. A hydraulic shock absorber for a vehicle as set forth in claim 10, further including a second scraper member disposed in the outer housing and adjacent the rigid scraper member, said second scraper being formed from a hard material but a material that is not as hard as that of the rigid scraper member.

13. A hydraulic shock absorber for a vehicle as set forth in claim 1, wherein the clearance between the outer diameter of the piston rod and the scraper member opening is in the range of 0.01 to 0.05 millimeters.

14. A hydraulic shock absorber for a vehicle as set forth in claim 13, wherein the clearance is in the range of 0.02 to 0.03 millimeters.

15. A hydraulic shock absorber for a vehicle as set forth in claim 1, wherein the length of the opening in the scraper member is in the range of 2 to 10 millimeters.

16. A hydraulic shock absorber for a vehicle as set forth in claim 15, wherein the length is about 5 millimeters.

* * * * *